(12) United States Patent
Hillukka et al.

(10) Patent No.: US 10,741,210 B1
(45) Date of Patent: Aug. 11, 2020

(54) MAGNETIC DISK DEVICE HAVING COUPLING OBSERVERS FOR REDUCING COUPLING ISSUES BETWEEN INDEPENDENTLY RUNNING MULTI-ACTUATORS

(71) Applicant: Seagate Technology LLC, Cupertino, CA (US)

(72) Inventors: Gary Ernest Hillukka, Cokato, MN (US); Evgeny Kharlsov, Brooklyn, NY (US); Josiah Natan Wernow, Minneapolis, MN (US); Kenneth A Haapala, Minneapolis, MN (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 16/537,311

(22) Filed: Aug. 9, 2019

(51) Int. Cl.
*G11B 19/20* (2006.01)
*G11B 5/55* (2006.01)

(52) U.S. Cl.
CPC ........ *G11B 19/2054* (2013.01); *G11B 5/5521* (2013.01); *G11B 5/5569* (2013.01); *G11B 5/5573* (2013.01); *G11B 5/5578* (2013.01); *G11B 19/2063* (2013.01); *G11B 19/2072* (2013.01); *G11B 19/2081* (2013.01)

(58) Field of Classification Search
None
See application file for complete search history.

(56) References Cited

U.S. PATENT DOCUMENTS

| | | | | |
|---|---|---|---|---|
| 5,223,993 A | * | 6/1993 | Squires | G06F 3/0601 360/246.7 |
| 5,261,058 A | * | 11/1993 | Squires | G06F 3/0601 360/78.12 |
| 5,274,773 A | * | 12/1993 | Squires | G06F 3/0601 710/38 |
| 5,341,351 A | * | 8/1994 | Ng | G06F 3/0601 360/77.02 |
| 5,355,486 A | * | 10/1994 | Cornaby | G11B 19/02 360/77.08 |
| 5,412,666 A | * | 5/1995 | Squires | G06F 3/0601 714/755 |
| 6,057,990 A | * | 5/2000 | Gilovich | G11B 5/4893 360/246.7 |
| 6,490,138 B1 | | 12/2002 | Prater | |

(Continued)

*Primary Examiner* — Tan X Dinh
(74) *Attorney, Agent, or Firm* — Holzer Patel Drennan

(57) ABSTRACT

HDDs including multiple heads driven by separate actuator spindles can read from or write to one or more platters simultaneously. Simultaneous active heads can be used to increase data rate or for other purposes. The multiple independently-actuated heads can access the same platter or different platters and may be moved across an associated platter surface in a number of different ways. However, multiple independently operating actuators may lead to mechanical coupling between the actuators. For example, as certain resonant frequencies, the movement of one actuator arm may cause unacceptable movement of another actuator arm within the HDD. This mechanical coupling can have detrimental effects on the HDD. The disclosed coupling observer and disable systems detect and mitigate detrimental effects of mechanical coupling between the independently operated actuators.

20 Claims, 7 Drawing Sheets

(56) References Cited

U.S. PATENT DOCUMENTS

| | | | | |
|---|---|---|---|---|
| 6,735,032 | B2* | 5/2004 | Dunn | G11B 5/59633 |
| | | | | 360/31 |
| 7,102,842 | B1* | 9/2006 | Howard | G11B 5/5521 |
| | | | | 360/61 |
| 7,430,091 | B2* | 9/2008 | Manasse | G11B 5/5578 |
| | | | | 360/75 |
| 9,830,939 | B1* | 11/2017 | Hamilton | G11B 5/5578 |
| 9,865,291 | B1* | 1/2018 | Pokharel | G11B 5/59611 |
| 9,911,442 | B1 | 3/2018 | Kharisov et al. | |
| 9,928,861 | B1 | 3/2018 | Erden et al. | |
| 10,037,779 | B1* | 7/2018 | Mendonsa | G11B 5/012 |
| 10,043,543 | B1* | 8/2018 | Buch | G11B 5/5582 |
| 10,049,691 | B1* | 8/2018 | Gaertner | G11B 5/5547 |
| 10,192,576 | B1* | 1/2019 | Gaertner | G11B 5/5578 |
| 10,431,246 | B2* | 10/2019 | Zhu | G11B 5/012 |
| 10,438,620 | B1* | 10/2019 | Ellis | G11B 20/1258 |
| 10,510,373 | B1* | 12/2019 | Granz | G11B 20/1217 |
| 10,522,175 | B1* | 12/2019 | Horgan | G11B 5/4833 |
| 10,547,264 | B1* | 1/2020 | Buch | H02P 23/0004 |
| 2007/0297083 | A1* | 12/2007 | van Zyl | G11B 5/4806 |
| | | | | 360/69 |
| 2008/0123213 | A1* | 5/2008 | Craig | G06F 3/0676 |
| | | | | 360/75 |

* cited by examiner

US 10,741,210 B1

MAGNETIC DISK DEVICE HAVING COUPLING OBSERVERS FOR REDUCING COUPLING ISSUES BETWEEN INDEPENDENTLY RUNNING MULTI-ACTUATORS

BACKGROUND

Storage capacities of hard disc drives (HDDs) have generally increased over time due in part to increases in areal density. Increases in HDD capacity driven by increased areal density, while reducing cost, can reduce effective input/output (I/O) performance (i.e., I/O access speed per unit capacity) if the read/write assembly remains substantially the same. For example, a relatively large write operation (e.g., a rebuild of a failed volume of a disc drive array) can take an unacceptable quantity of time at the aerial densities now found in HDDs.

One way to increase I/O performance is to utilize multiple actuator arms with associated read/write heads simultaneously, and independently running in parallel. Such parallelism can increase the rate of input/output operations (IOPS) and thereby improved I/O performance. Further, use of independently operating actuator arms and their associated read/write heads can provide improved read/write flexibility for a system designer. For example, an HDD can be configured with zones having different levels of throughput and capacity, and each of multiple read/write heads running in parallel can be operated in different modes to improve throughput in some zones while improving capacity (or another performance parameter) in other zones. However, multiple read/write heads running in parallel can cause coupling issues between the read/write heads, which may negatively affect HDD performance, including but not limited to introducing an unacceptable quantity of read/write errors.

SUMMARY

Implementations described and claimed herein address the foregoing problems by providing a hard disc drive comprising a spindle, a first actuator arm, a second actuator arm, and a coupling observer. The spindle has a spindle motor to rotate at least one data storage platter, each data storage platter having at least one data storage surface. The first actuator arm includes a first servo motor and a first write head, the first write head to selectively write data to one of the data storage surfaces. The second actuator arm includes a second servo motor and a second write head, the second write head to selectively write data to one of the data storage surfaces, the first actuator arm moving independently from the second actuator arm. The coupling observer monitors output to the first servo motor and disables the second write head when the output to the first servo motor satisfies a predetermined coupling magnitude threshold between the first actuator arm and the second actuator arm.

Other implementations are also described and recited herein. This Summary is provided to introduce a selection of concepts in a simplified form that are further described below in the Detailed Descriptions. This Summary is not intended to identify key features or essential features of the claimed subject matter, nor is it intended to be used to limit the scope of the claimed subject matter.

BRIEF DESCRIPTIONS OF THE DRAWINGS

DETAILED DESCRIPTIONS

HDDs including multiple heads driven by separate actuator spindles can read from or write to one or more platters simultaneously. Simultaneous active heads can be used to increase data rate or for other purposes (e.g., to increase reliability, service different read/write requests in parallel, etc.). The multiple independently-actuated heads can access the same platter or different platters and may be moved across an associated platter surface in a number of different ways. In one implementation, a two (or more) part actuator may independently rotate two arms about a common actuator spindle axis (see e.g., FIG. 1 and the description thereof below). In another implementation, two (or more) actuator spindles are located at different positions around the platter, independently rotating about different actuator spindle axes (see e.g., FIG. 2 and the description thereof below).

HDD designs with multiple independent actuators simultaneously driving multiple actuator arms can be flexibly configured, providing many options for optimizing different HDD design parameters (including but not limited to writing using one actuator arm while seeking, loading, or unloading with another actuator arm). However, independently operating multiple actuators may lead to mechanical coupling (also referred to herein as coupling) between the actuators. For example, at certain resonant frequencies, the movement of one actuator arm may cause unacceptable movement of another actuator arm within the HDD. This coupling can have detrimental effects on the HDD both in a factory test environment and in the field. The following implementations incorporate a coupling observer and disable system to detect and mitigate the detrimental effects of mechanical coupling between the actuators.

Figure 1:
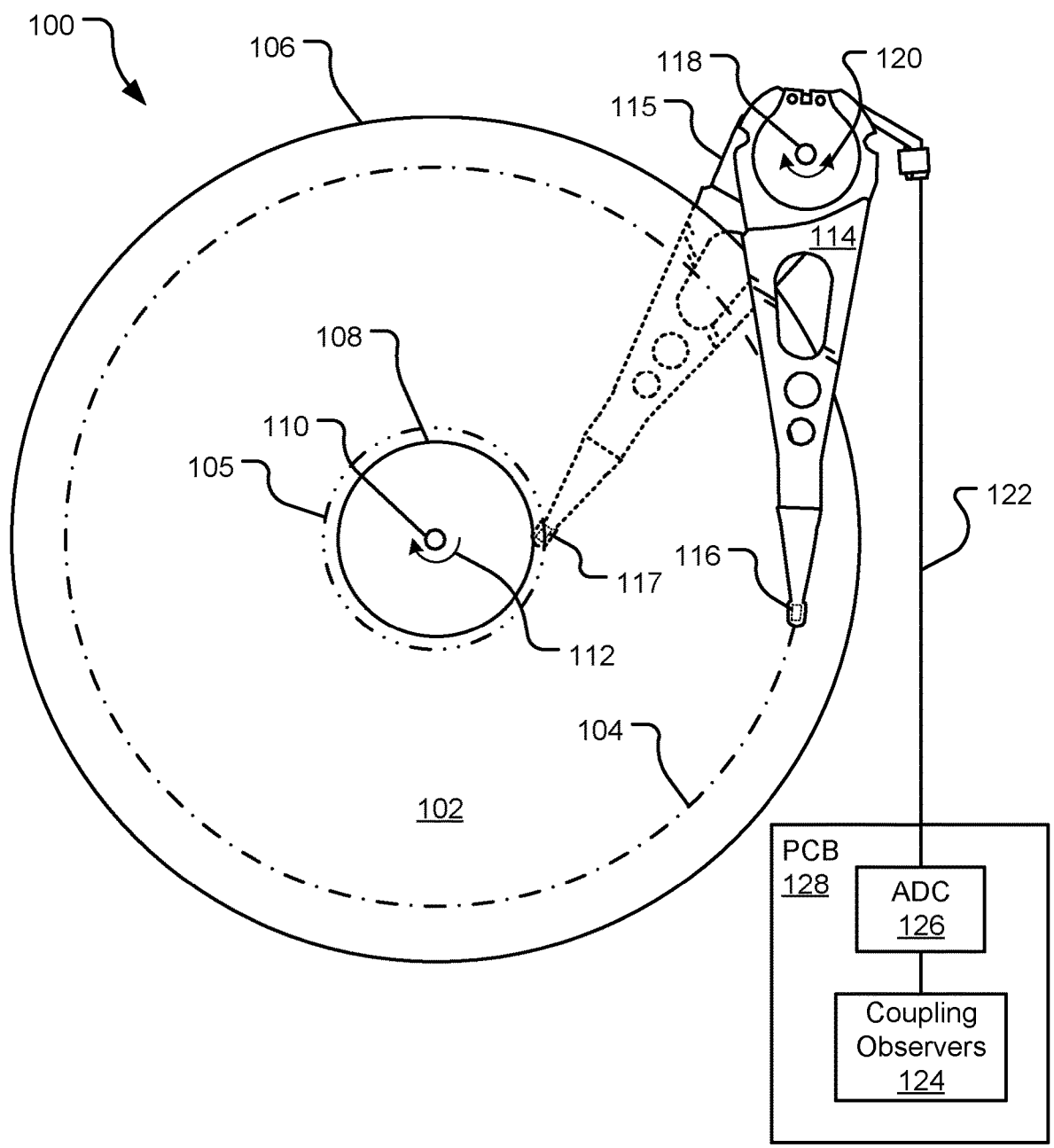
FIG. 1 illustrates an example hard disc drive assembly including a storage platter with two actuator arms mounted on a common actuator spindle but operated independently.

FIG. 1 illustrates an example hard disc drive (HDD) 100 assembly including a storage platter (or disc) 102 with two actuator arms 114, 115 mounted on a common actuator spindle 118 but operated independently. The storage platter 102 includes an outer diameter 106 and an inner diameter 108 between which are a number of substantially circular concentric data tracks making up an entirety of the readable and/or writable surface area of the storage platter 102. Specific locations on the storage platter 102 may be defined by any available addressing scheme (e.g., cylinder-head-sector (CHS) addressing and logical block addressing (LBA) schemes). The storage platter 102 rotates at high speed about platter spindle 110 (as illustrated by arrow 112) as information is written to and/or read from data tracks (e.g., data tracks 104, 105) on the storage platter 102.

Information may be written to and read from the storage platter 102 via the actuator arms 114, 115 and their respective sliders 116, 117. More specifically, the actuator arm 114 pivots about actuator spindle 118 using a first servo motor (or voice-coil motor (VCM), not shown) during a seek operation to locate the data track 104 on the storage platter 102, as illustrated by arrow 120. The actuator arm 114 extends toward the storage platter 102 and the slider 116 is located at an end of the actuator arm 114 distal from the actuator spindle 118. The slider 116 flies in close proximity above the storage platter 102 while reading data from and/or writing data to the depicted top surface of the storage platter 102.

Similarly, the actuator arm 115 independently pivots about the actuator spindle 118 using a second servo motor (not shown) during a seek operation to locate the data track 105 on the storage platter 102. The actuator arm 115 extends toward the storage platter 102 and the slider 117 is located at an end of the actuator arm 115 distal from the actuator spindle 118. The slider 117 flies in close proximity below the storage platter 102 while reading data from and/or writing data to a bottom surface of the storage platter 102. In some implementations, instead of utilizing completely separate servo motors for each of the actuator arms 114, 115, the HDD 100 may incorporate a 2-part actuator, each part of which assigned to one of the actuator arms 114, 115.

In other implementations, there may be two or more storage platters stacked and rotating together about the platter spindle 110. In such implementations, each of the actuator arms 114, 115 and their respective sliders 116, 117 are assigned to one of the storage platters. For example, the actuator arm 114 and its respective slider 116 may read data from and/or write data to the storage platter 102, while the actuator arm 115 and its respective slider 117 may read data from and/or write data to another storage platter (not shown) stacked above or below the storage platter 102. In still further implementations, the HDD 100 includes a stacked array of any number of storage platters, each of which has an arm and a respective slider as described herein assigned to one or both surfaces or sides (i.e., top and bottom surfaces) of the storage platters.

The storage platter 102 includes an array of embedded independent magnetic domains and the sliders 116, 117 each include an array of microelectronic components (e.g., a read element, a write element, thermal actuators, other head-media spacing micro-actuators, etc., not shown). The read elements are magneto-resistive, which allows them to read data from the magnetic domains as they pass underneath the read element. The write elements generate magnetic fields that selectively change polarity of the magnetic domains of the storage platter 102 as they pass underneath the write elements, which allows the write elements to write data to the storage platter 102.

A flex cable 122 provides electrical connection paths from a printed circuit board (PCB) 128 to the various microelectronic components attached to the actuator arms 114, 115 and the sliders 116, 117. The flex cable 122 transmits data signals from the read elements and/or to the write elements, while allowing pivotal movement of the actuator arms 114, 115 during operation. In various implementations, there may be multiple flex cables, one for each of the actuator arms 114, 115. Further, the flex cable 122 may be shared from the PCB and then split as it reaches the actuator arms 114, 115 and routed along the actuator arms 114, 115 to the sliders 116, 117.

The PCB 128 includes the coupling observers 124, as well as an analog-to-digital converter (ADC) 126. While the coupling observers 124 are depicted in FIG. 1 as positioned in a digital space upstream of the ADC 126, in other implementations, the coupling observers 124 could be positioned on the analog outputs of the ADC 126 closer to the actuator arms 114, 115.

The coupling observers 124 monitor seeking operations to be performed by each of the actuator arms 114, 115. They also selectively disable write operations (or the write head itself) at the end of one of the actuator arms 114, 115 if a seek operation to be performed by the other of the actuator arms 114, 115 is predicted to cause mechanical coupling at the one of the actuator arms 114, 115 that exceeds a predetermined coupling threshold (referred to herein as a coupling event). The predetermined coupling threshold is set low enough to reduce or prevent write errors, but also high enough to not cause an unacceptable performance drop in the HDD 100 due to the resulting unavailability of the selectively disabled write head.

Appearances of the actuator arms 114, 115 and other features of the HDD 100 are for illustration purposes only and the features are not drawn to scale. The various microelectronic components attached to each of the sliders 116, 117 may be referred to in total as a transducer head. The presently disclosed technology may apply to rotating disc storage drive technologies other than the magnetic domain HDD 100 depicted in FIG. 1 (e.g., optical disc drives). Additional details regarding the coupling observers 124 and other features of the HDD 100 may be found elsewhere herein.

Figure 2:
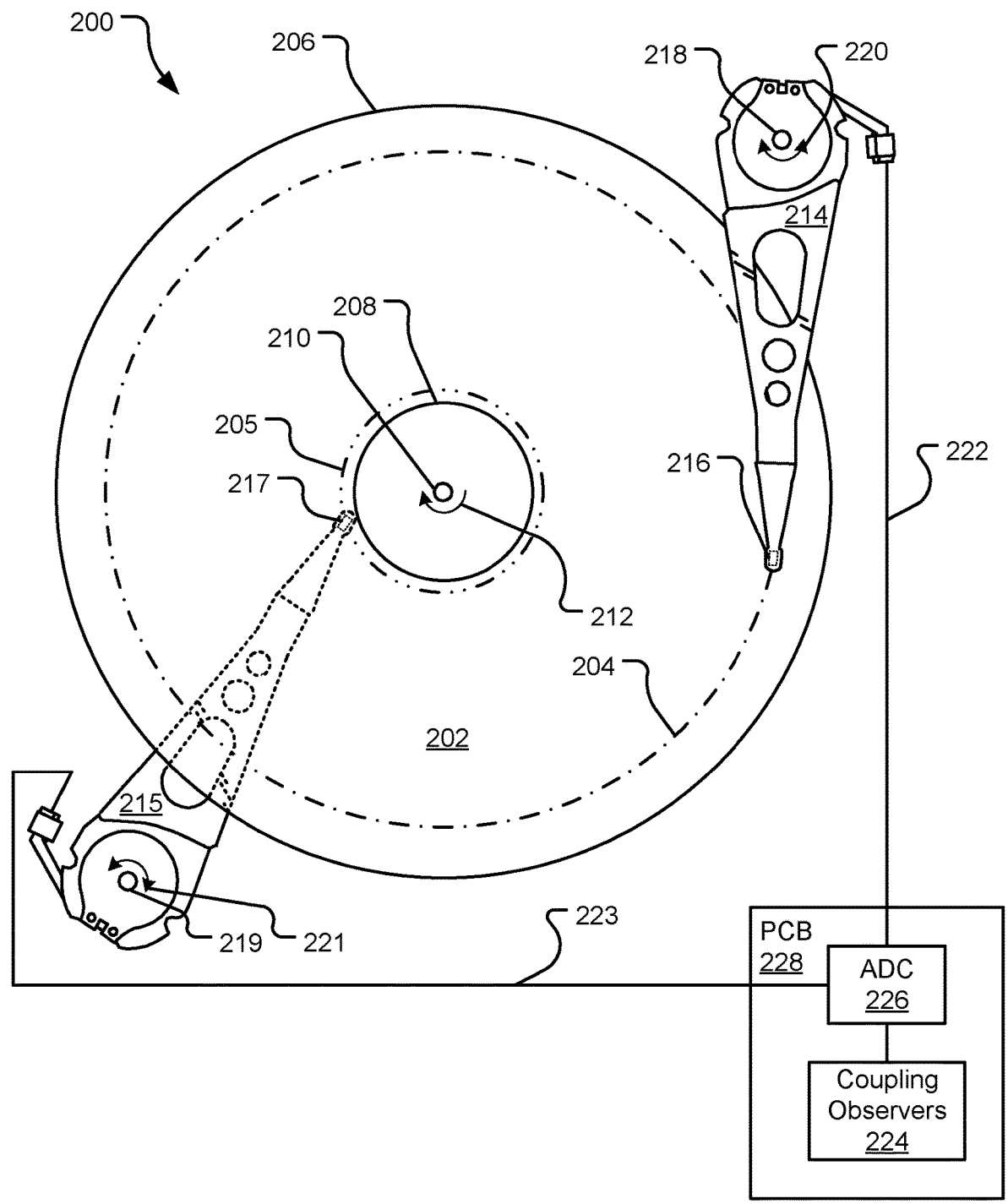
FIG. 2 illustrates an example hard disc drive assembly including a storage platter with two actuator arms mounted on different actuator spindles and operated independently.

FIG. 2 illustrates an example hard disc drive assembly 200 including a storage platter (or disc 202) with two actuator arms 214, 215 mounted on different actuator spindles 218, 219 and operated independently. The storage platter 202 includes an outer diameter 206 and an inner diameter 208 between which are a number of substantially circular concentric data tracks making up an entirety of the readable and/or writable surface area of the storage platter 202. The storage platter 202 rotates at high speed about platter spindle 210 (as illustrated by arrow 212) as information is written to and/or read from data tracks (e.g., data tracks 204, 205) on the storage platter 202.

Information may be written to and read from the storage platter 202 via the actuator arms 214, 215 and their respective sliders 216, 217. More specifically, the actuator arm 214 pivots about actuator spindle 218 using a first servo motor during a seek operation to locate the data track 204 on the storage platter 202, as illustrated by arrow 220. The actuator arm 214 extends toward the storage platter 202 and the slider 216 is located at an end of the actuator arm 214 distal from the actuator spindle 218. The slider 216 flies in close proximity above the storage platter 202 while reading data from and/or writing data to the depicted top surface of the storage platter 202.

The actuator arm 215 independently pivots about a different actuator spindle 219 using a second servo motor during another seek operation to locate the data track 205 on the storage platter 202, as illustrated by arrow 221. The actuator arm 215 extends toward the storage platter 202 and the slider 217 is located at an end of the actuator arm 215 distal from the actuator spindle 218. The slider 217 flies in close proximity below the storage platter 202 while reading data from and/or writing data to a bottom non-depicted surface of the storage platter 202.

In various implementations, the actuator arms 214, 215 of the HDD 200 may write to opposite surfaces of the storage platter 202 (as depicted) or potentially the same depicted top surface of the storage platter 202. In still further, implementations, the actuator arms 214, 215 of HDD 200 may write to different platters as described in detail with reference to FIG. 1.

Flex cables 222, 223 provide electrical connection paths from a printed circuit board (PCB) 228 to various microelectronic components attached to the actuator arms 214, 215 and the sliders 216, 217, respectively. The flex cables 222, 223 transmits data signals from read elements and/or to write elements, while allowing pivotal movement of the actuator arms 214, 215 during operation. In some implementations, a common flex cable may extend from the PCB and then split into the flex cables 222, 223 prior to reaching the actuator arms 214, 215, respectively. The flex cables 222, 223 are then routed along the actuator arms 214, 215 to the sliders 216, 217, respectively.

The PCB 228 includes the coupling observers 224, as well as an analog-to-digital converter (ADC) 226. The coupling observers 224 monitor seeking operations to be performed by each of the actuator arms 214, 215. They also selectively disable write operations (or the write head itself) at the end of one of the actuator arms 214, 215 if a seek operation to be performed by the other of the actuator arms 214, 215 is predicted to cause mechanical coupling at the one of the actuator arms 214, 215 that exceeds a predetermined coupling threshold. The predetermined coupling threshold is set low enough to reduce or prevent write errors, but also high enough to not cause an unacceptable performance drop in the HDD 200 due to the resulting unavailability of the selectively disabled write head.

Appearances of the actuator arms 214, 215 and other features of the HDD 200 are for illustration purposes only and the features are not drawn to scale. The various microelectronic components attached to each of the sliders 216, 217 may be referred to in total as a transducer head. The presently disclosed technology may apply to rotating disc storage drive technologies other than the magnetic domain HDD 200 depicted in FIG. 2 (e.g., optical disc drives). Additional details regarding the coupling observers 224 and other features of the HDD 200 may be found elsewhere herein.

Figure 3:
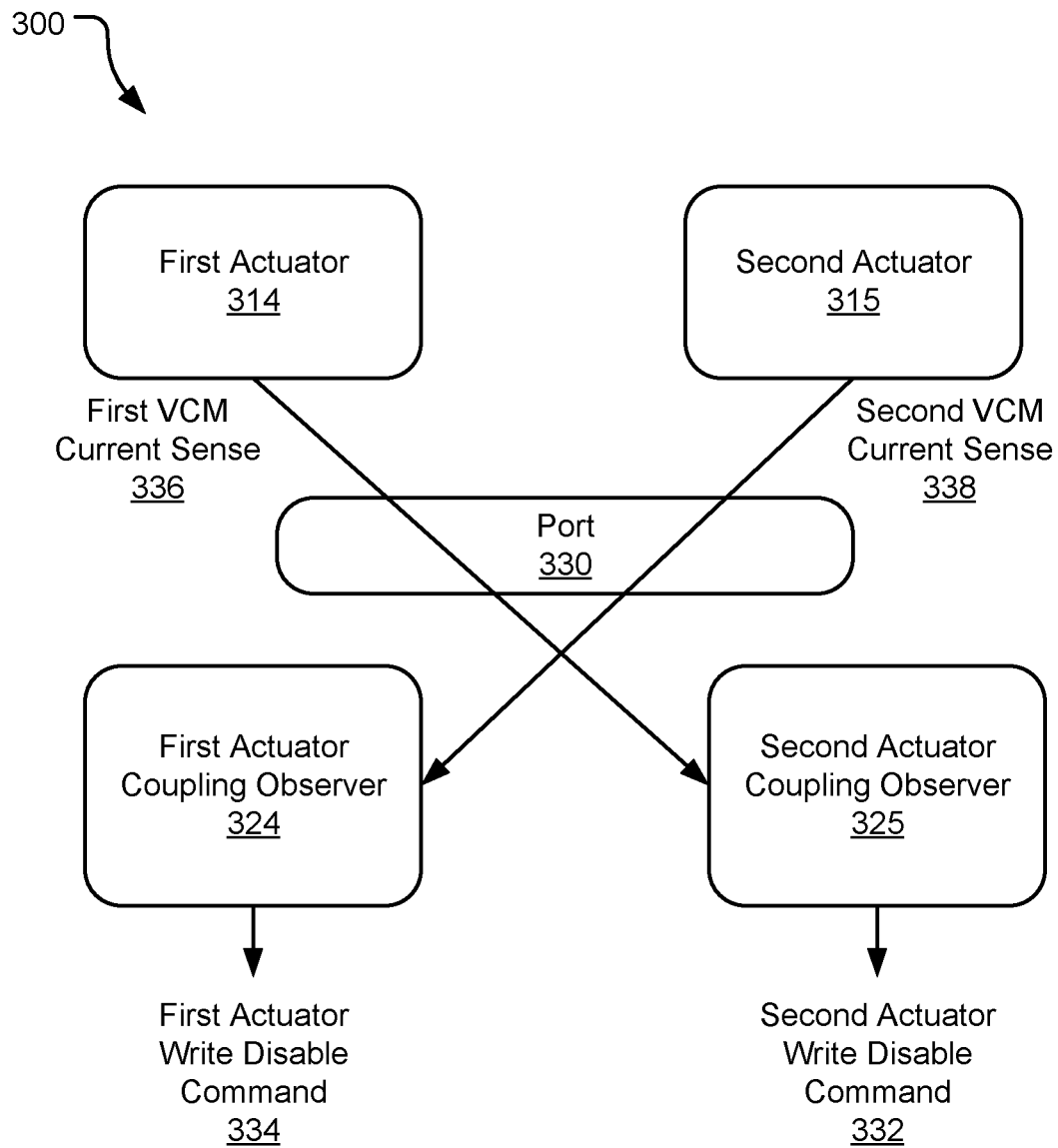
FIG. 3 illustrates an example block diagram of a coupling observer and disable system.

FIG. 3 illustrates an example block diagram of a coupling observer and disable system 300. The coupling observer and disable system 300 monitors seeking operations to be performed by each of actuators 314, 315 and selectively disables write operations thereto. More specifically, a VCM current drives the first actuator 314 to perform a variety of seek operations over time. A second actuator coupling observer 325 monitors the first VCM current (i.e., first VCM current sense 336) via port 330 (e.g., a low-latency port (LLP)). The second actuator coupling observer 325 includes a filter or other structure capable of detecting events in the first VCM current sense 336 that are determined (or predicted) to result in a coupling event in the second actuator 315. Upon detection the coupling event, the second actuator coupling observer 325 sends out a second actuator write disable command 332 that may execute in software or firmware of an associated HDD.

Similarly, a VCM current drives the second actuator 315 to perform a variety of seek operations over time. A first actuator coupling observer 324 also monitors the second VCM current (i.e., second VCM current sense 338) via the port 330. The first actuator coupling observer 324 includes a filter or other structure capable of detecting events in the second VCM current sense 338 that are determined (or predicted) to result in a coupling event in the first actuator 314. Upon detection of the coupling event, the first actuator coupling observer 324 sends out a first actuator write disable command 334.

In various implementations, the VCM currents monitored across the port 330 by the coupling observers 324, 325 may be analog or digital based on a selected placement of an analog-to-digital converter placed within the system 300 (not shown, see e.g., ADCs 126, 226 of FIGS. 1 and 2, respectively).

The predetermined coupling threshold(s) for the coupling event(s) are set low enough to reduce or prevent write errors but are also high enough to not cause an unacceptable performance drop in the associated HDD due to the resulting unavailability of the selectively disabled write head. The LLP 330 permits the actuator coupling observers 324, 325 to act upon a determined (or predicted) coupling event fast enough to precede the coupling event actually occurring at one of the actuator arms 314, 315. More specifically, the write disable commands 332, 334 are timed such that they disable write operations just prior to the predicted coupling event actually occurring in an associated HDD. Further, the write disable commands 332, 334 have a duration that matches the coupling event and ends shortly after the coupling event is expected to end. In some example implementations, the write disable commands 332, 334 are designed to disable write operations 100-200 microseconds prior to a predicted high-magnitude coupling event and extend 0.5-1.5 milliseconds beyond an ending of the predicted high-magnitude coupling event. The overlap ensures that each high-magnitude coupling event is entirely covered by a write disable command.

In various implementations, additional coupling observers may be connected and operated in a similar manner as that depicted in FIG. 3 and described above. For instance, in a 3-actuator system, the first actuator coupling observer may monitor and issue write disable commands based on both a second VCM current sense and a third VCM current sense. The second actuator coupling observer may monitor and issue write disable commands based on both the first VCM current sense and the third VCM current sense. The third actuator coupling observer may monitor and issue write disable commands based on both the first VCM current sense and the second VCM current sense. Additional details regarding the coupling observer and disable system 300 may be found elsewhere herein.

Figure 4:
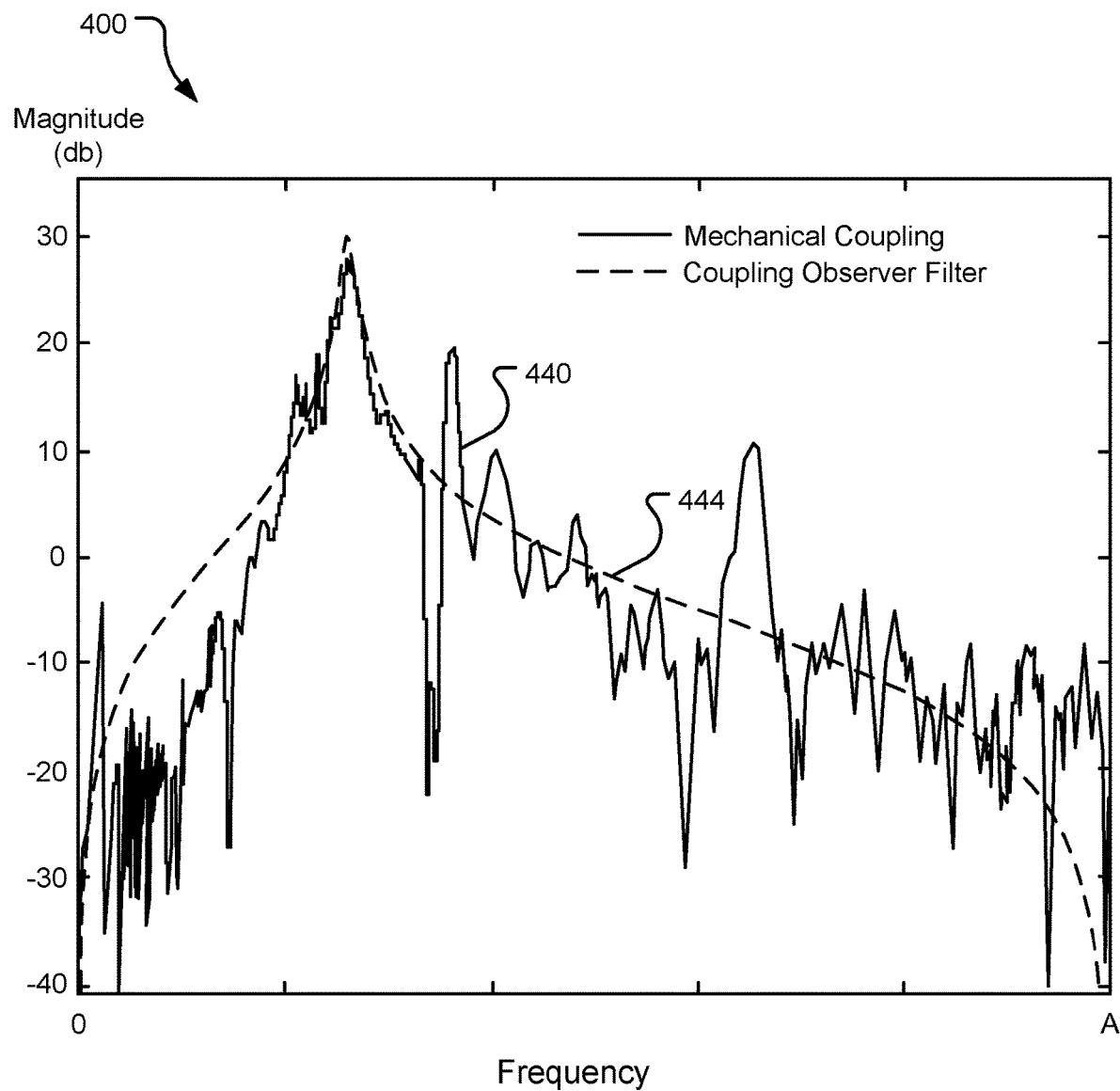
FIG. 4 illustrates an example graph of mechanical coupling magnitude as a function of frequency with a simple filter approximating the mechanical coupling.

FIG. 4 illustrates an example graph 400 of mechanical coupling magnitude as a function of frequency with a simple filter approximating the mechanical coupling transfer function. A mechanical coupling transfer function and filter model is illustrated in decibels (dB) as a function of frequency, which in turn is illustrated as an arbitrary range from 0 to A that will vary between HDDs and individual heads therein. Solid line 440 is a mapping of a transfer function of VCM current of a first actuator arm to displacement of a second actuator arm (also described as a detected coupling in a first actuator arm as a function of frequency of seek operations in a second actuator arm) in an HDD (i.e., a coupling transfer function magnitude response curve). A similar mapping may be made of detected coupling in the second actuator arm as a function of VCM current in the first actuator arm. In various implementations, the solid line 440 may be measured once for an entire line of HDDs, once for each individual HDD, once per head within an HDD, periodically for each individual HDD, head therein, or an entire line of HDDs, or continuously for each individual HDD or head therein.

The dashed line 444 illustrates the performance of a simple filter (e.g., a fixed $2^{nd}$ order filter) designed to mirror the coupling (or approximate the mechanical coupling transfer function) in the first actuator arm as a function of frequency of VCM current in the second actuator arm (solid line 440). The simple filter can then be used during operation of the HDD based on a previously mapped coupling magnitude response curve to selectively disable write operations on the first actuator arm based on the frequency of VCM current using the second actuator arm.

The illustrated lines 440, 444 are provided as mere examples. The detected coupling, as well as the filter performance, may take a variety of shapes. For example, the filter may actually have a complex performance curve (i.e., a complex filter) with a response that accommodates for multiple predetermined coupling modes and/or ranges. Still further, the filter may be an adaptive filter that adapts or modifies the filter response (and as a result, the predetermined coupling mode(s) and/or range(s)) over time based on balancing quantity and rate of erroneous write operations monitored by a write error monitor (not shown, see e.g., write error monitor 658 of FIG. 6) balanced against write operation availability of the coupled actuator arm.

While the graph 400 relates mechanical coupling magnitude as a function of actuator servo frequency, other factors may influence or drive mechanical coupling magnitude. For example, impulse or step-wise changes in actuator servo driving current may create mechanical coupling events that apply across a broad frequency range. Other factors could include coding errors and discontinuities in actuator arm control schemes (e.g., shifting between read/write operations and head loading/unloading). Such additional factors could be included in a model for designing a filter or multiple filters to match detected coupling in the second actuator arm as a function of frequency of VCM current in the first actuator arm, and vice versa.

Figure 5A:
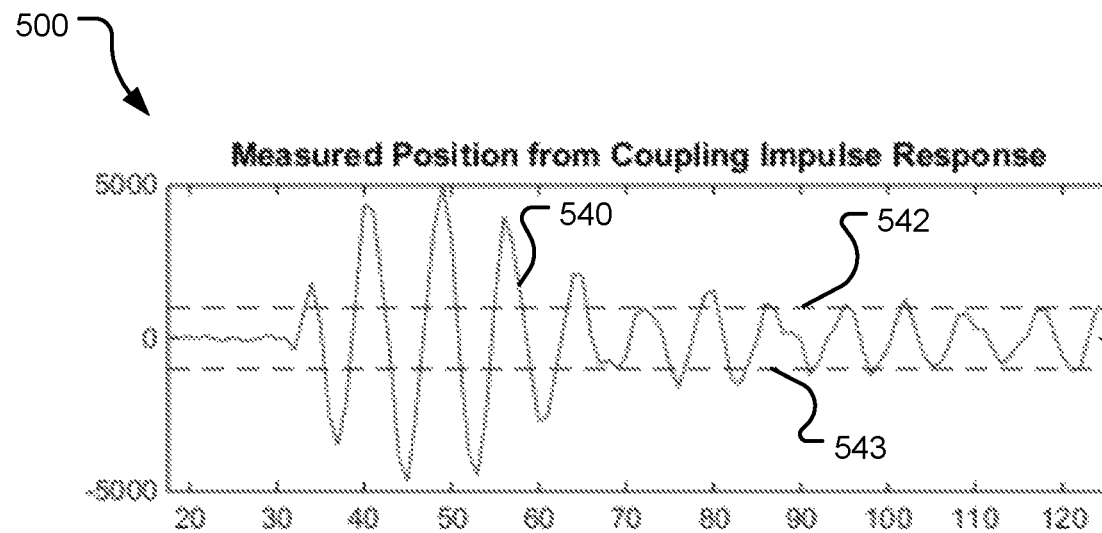
FIG. 5A illustrates an example graph of a mechanical coupling transfer function time domain response.

FIG. 5A illustrates an example graph 500 of a mechanical coupling transfer function time domain response. The mechanical coupling transfer function (or impulse response) 540 is illustrated in head displacement (or measured distance) from 0 to 5000 (or −5000 distance units as the displacement is oscillating) over time, which in turn is illustrated as an arbitrary range from 20 to 120 time units that will vary between HDDs and individual heads therein. The mechanical coupling transfer function 540 is a mapping of VCM current of a first actuator arm to displacement of a second actuator arm (also described as a detected coupling in a first actuator arm as a function of frequency of seek operations in a second actuator arm) in an HDD (also referred to herein as a coupling transfer function magnitude response curve). A similar mapping may be made of detected coupling in the second actuator arm as a function of VCM current in the first actuator arm.

A predetermined coupling magnitude threshold (illustrated by dashed lines 542, 543) is set to identify a coupling event and trigger a write disable operation on the coupled actuator arm. Here, the predetermined coupling magnitude threshold is set at approximately 1000 distance units. As such, based on the transfer function 540, write operations using the first actuator arm are disabled before the VCM current for the second actuator arm first exceeds the threshold (at around 30 time units) and last until the transfer function 540 drops back below the threshold and remains there for a predetermined time period (i.e., it satisfies a settle period or feature) or the write disable command triggered by the transfer function 540 exceeds a maximum time duration (i.e., it satisfies a time-out period or feature).

In various implementations, additional details of the mechanical coupling transfer function 540 are as described above with reference to the solid line 440 and mechanical coupling transfer function of FIG. 4, or elsewhere herein.

Figure 5B:
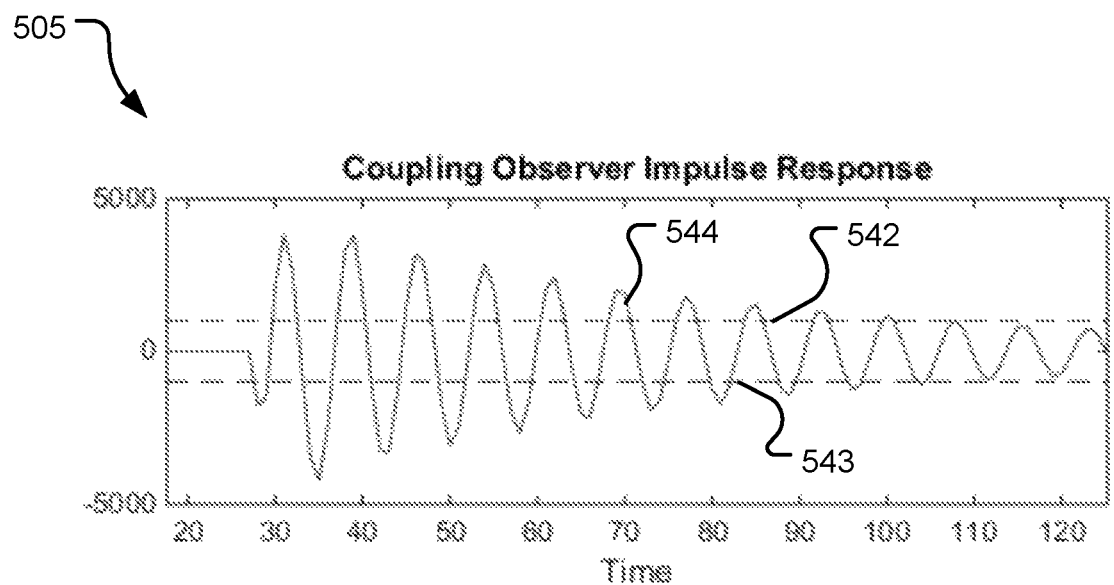
FIG. 5B illustrates an example graph of a simple filter approximating the mechanical coupling transfer function of FIG. 5A.

FIG. 5B illustrates an example graph 505 of a simple filter approximating the mechanical coupling transfer function of FIG. 5A. Coupling observer filter impulse response 544 illustrates the performance of a simple filter (e.g., a fixed $2^{nd}$ order filter) designed to mirror the coupling (or approximate the mechanical coupling transfer function) in the first actuator arm as a function of frequency of VCM current in the second actuator arm (see e.g., transfer function 540). The simple filter can then be used during operation of the HDD based on a previously mapped coupling magnitude response curve to selectively disable write operations on the first actuator arm based on the frequency of VCM current using the second actuator arm.

As discussed above with reference to transfer function 540 of FIG. 5A, a predetermined coupling magnitude threshold (illustrated by dashed lines 542, 543) is set to identify a coupling event and trigger a write disable operation on the coupled actuator arm. Here, the predetermined coupling magnitude threshold is set at approximately 1000 distance units. As such, based on the impulse response 544, write operations using the first actuator arm are disabled before the VCM current for the second actuator arm first exceeds the threshold (again, at around 30 time units) and last until the transfer function 540 drops back below the threshold and remains there for a predetermined time (i.e., it satisfies a settle period or feature) or the write disable command triggered by the impulse response 544 exceeds a maximum time duration (i.e., it satisfies a time-out period or feature).

In various implementations, additional details of the impulse response 544 are as described above with reference to the dashed line 444 and simple filter of FIG. 4, or elsewhere herein.

Figure 6:
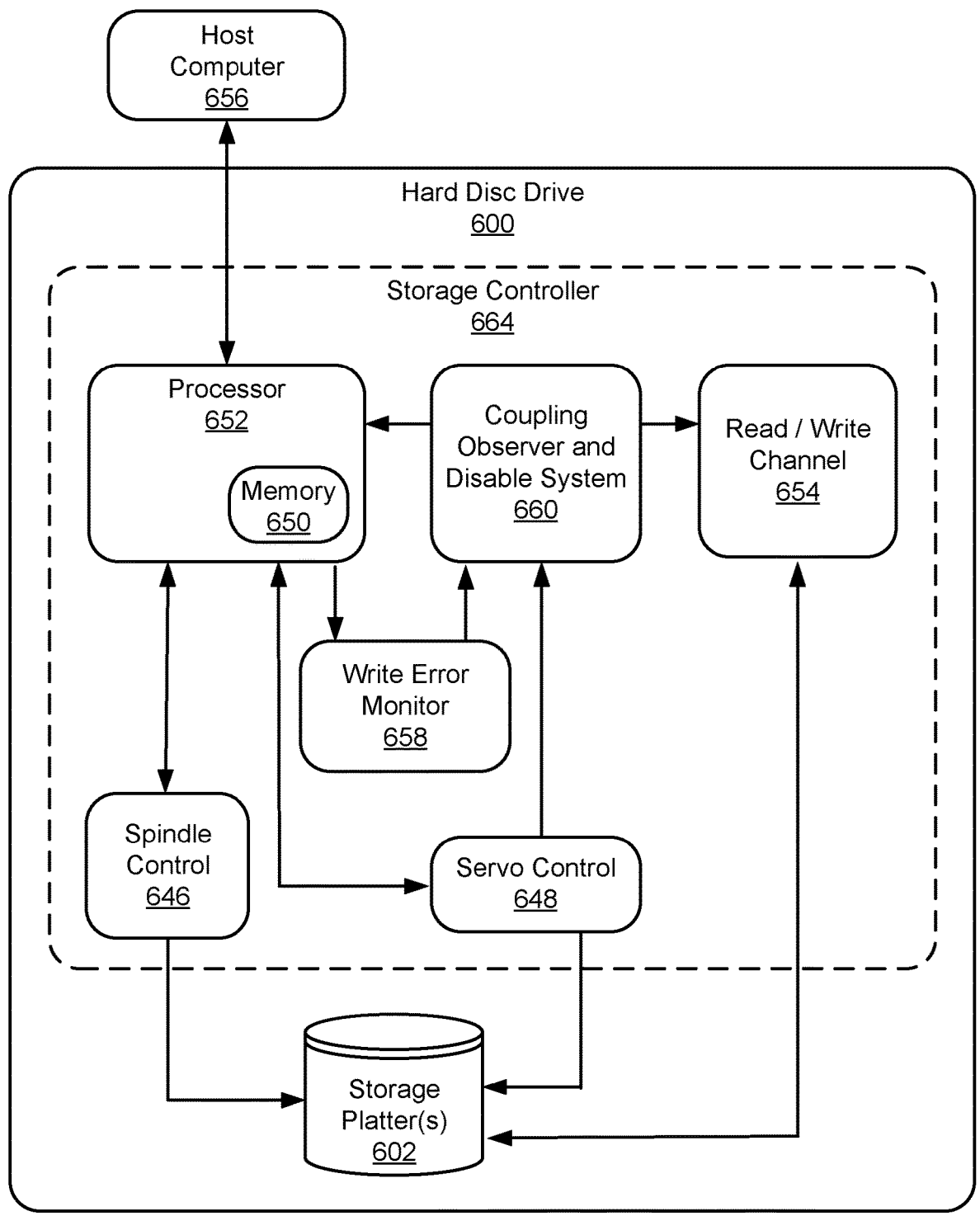
FIG. 6 illustrates an example schematic of a hard disc drive assembly including a coupling observer and disable system.

FIG. 6 illustrates an example schematic of a hard disc drive assembly 600 including a coupling observer and disable system 660. FIG. 6 illustrates functional circuits that are resident on one or more printed circuit boards used to control operation of the HDD 600. Storage controller 664 is operably and communicatively connected to a host computer 656. Control communication paths are provided between the host computer 656 and a processor 652 (in some implementations, with associated memory 650) and between the processor 652 and a set of storage platters 602 via a number of read/write channels (e.g., read and write channel 654). The processor 652 generally provides top-level communication and control for the storage controller 664 in conjunction with processor-readable instructions for the processor 652 encoded in the storage platters 602, memory 650, or other storage media. The processor-readable instructions control writing to and reading from data sectors on the storage platters 602. The processor-readable instructions further include instructions for running the coupling observer and disable system 660, as well as the write error monitor 658.

The storage controller 664 controls data stored to and read from the storage platters 602 by manipulating rotation of the storage platters and relative position of sliders containing transducer heads (not shown) with reference to the storage platters 602. A spindle motor control circuit 646 controls rotation of the storage platters 602, while a servo motor control circuit 648 controls angular position of actuator (and/or micro-actuator) arms that move the sliders between data tracks on the set of storage platters 602 and controls relative positions of corresponding transducer heads.

The coupling observer and disable system 660 monitors VCM current (or seeking operations) to be performed by each of the actuator arms and selectively disables write operations using one of the actuator arms if a seek operation to be performed by another of the actuator arms is predicted to cause a coupling event (mechanical coupling that exceeds a predetermined coupling threshold). The predetermined coupling threshold is set low enough to reduce or prevent write errors, but also high enough to not cause an unacceptable performance drop in the HDD 600 due to the resulting unavailability of the selectively disabled write head. Further, the coupling observer and disable system 660 may include a counter that logs coupling events for later analysis. Still further, the coupling observer and disable system 660 may include an override or time-out feature that overrides a coupling event if it exceeds a predetermined time limit.

The write error monitor 658 is included in implementations that utilize an adaptive filter to implement the coupling observer and disable system 660. The adaptive filter adapts predetermined coupling magnitude threshold(s) and/or range(s) over time based on balancing quantity and rate of erroneous write operations monitored by the write error monitor 658 balanced against write operation availability of the coupled actuator arm.

Additional details regarding the coupling observer and disable system 660 and other features of the HDD 600 may be found elsewhere herein. Further, other configurations of the storage controller 664 are contemplated herein. For example, the storage controller 664 may include interface circuitry, buffer(s), associated device peripheral hardware, encryption unit(s), compression unit(s), etc. Further, processor-readable instructions may also be included on processor-readable storage media within the host computer 656, the memory 650, storage platter(s) 602, or elsewhere within the HDD 600. The term "processor-readable storage media" includes but is not limited to, random access memory (RAM), read-only memory (ROM), electrically erasable programmable read-only memory (EEPROM), flash memory, compact disc read-only memory (CD-ROM), digital versatile discs (DVD), or other optical disc storage, magnetic cassettes, magnetic tape, magnetic disc storage or other magnetic storage devices, or any other tangible medium which can be used to store the desired information and which can be accessed by the processor 652. In contrast to tangible processor-readable storage media, intangible processor-readable communication signals may embody processor-readable instructions, data structures, program modules or other data resident in a modulated data signal, such as a carrier wave or other signal transport mechanism. While the system for management of system files on the HDD 600 is disclosed herein in context of a disc drive assembly (or hard disc drive), one or more aspects the technology disclosed herein may also be applicable to other storage devices, including those enumerated above.

For purposes of this description and meaning of the claims, the term "memory" means a tangible data storage device (e.g., the HDD 600), including non-volatile memories (e.g., flash memory) and volatile memories (e.g., dynamic random-access memory), within storage platter(s) 602 and/or memory 650. Computer-readable instructions either permanently or temporarily reside in the memory 650, along with other information such as data, virtual mappings, operating systems, applications, and the like that are accessed by the host computer 656 to perform the desired functionality. The term "memory" expressly does not include a transitory medium such as a carrier signal, but the computer instructions can be transferred to the memory 650 wirelessly.

Figure 7:
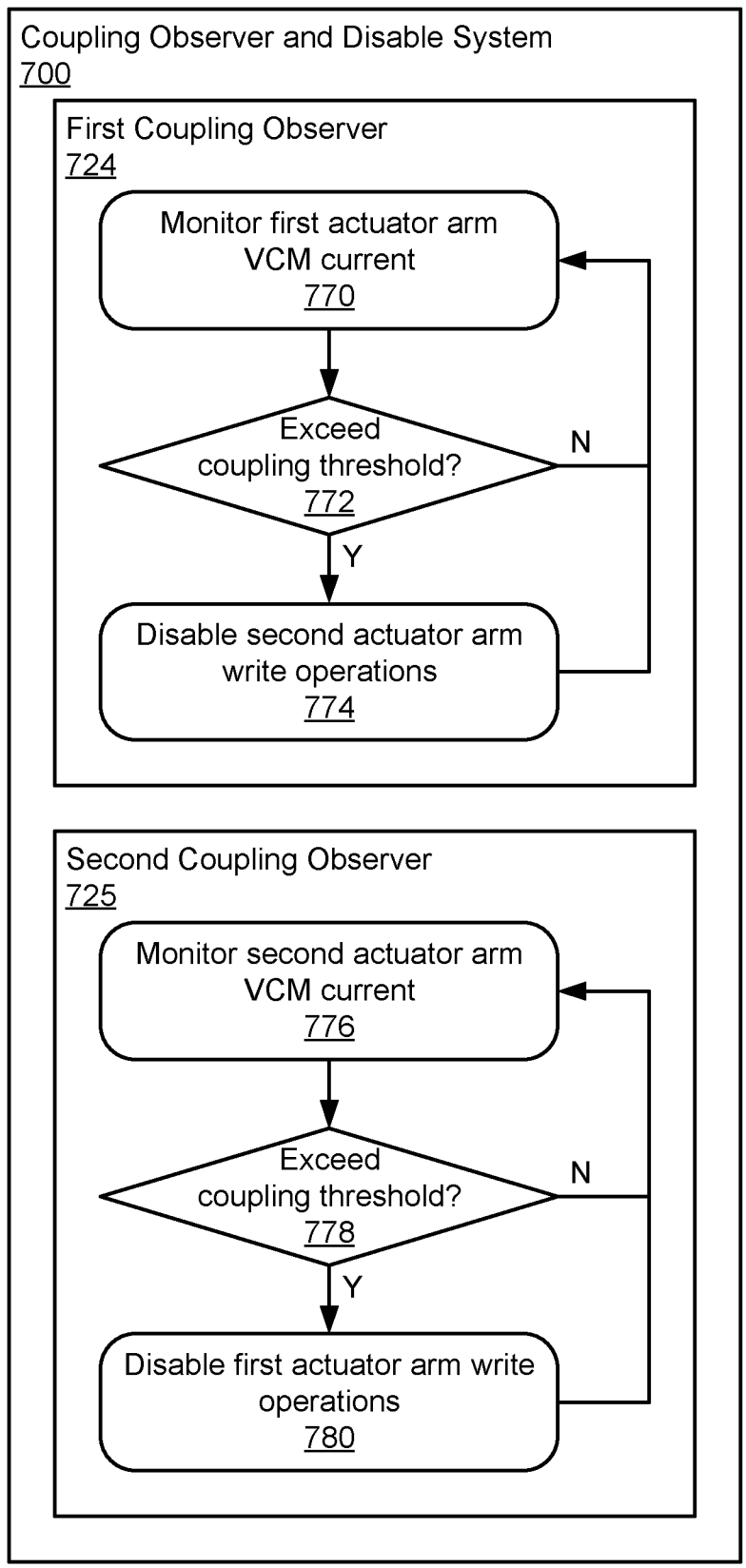
FIG. 7 illustrates example operations for using a coupling observer and disable system to selectively disable write functionality of an independently operated actuator arm.

FIG. 7 illustrates example operations for using a coupling observer and disable system 700 to selectively disable write functionality of an independently operated actuator arm within an HDD. The system 700 includes a first coupling observer 724 and a second coupling observer 725, each of which perform a similar set of operations as described in detailed below. Other coupling observer and disable systems may include additional similar coupling observers as that depicted and described herein and thus the system 700 is scalable to any number of independently operating actuator arms and associated coupling observers.

A first monitoring operation 770 monitors VCM current output driving seeking operations to a first actuator arm over time. A first comparing operation 772 compares the VCM current output to one or more predetermined coupling magnitude thresholds. In various implementations, the comparing operation 772 utilizes a filter to establish the predetermined coupling magnitude threshold(s) as a function of VCM current output frequency. If the VCM current output remains below the predetermined coupling magnitude threshold(s), the first monitoring operation 770 and the first comparing operation 772 repeat iteratively while the HDD remains in operation.

If the predetermined coupling magnitude threshold is reached, a first disabling operation 774 disables write operations using a second independently operated actuator arm within the HDD. The disabling operation 774 prevents erroneous writes using the second actuator arm due to an unacceptable coupling effect caused by the first actuator arm. The disabling operation 774 lasts at least as long as the predetermined coupling magnitude threshold is met or exceeded (referred to herein as a coupling event). Once the coupling event ends, the monitoring operation 770 is repeated. Operations 770, 772, 774 repeat iteratively as described above while the HDD remains in operation.

Simultaneously with operations 770, 772, 774, a second monitoring operation 776 monitors VCM current output driving seeking operations to the second actuator arm over time. A second comparing operation 778 compares the second VCM current output to one or more predetermined coupling magnitude thresholds. In various implementations, the comparing operation 778 utilizes a filter to establish the predetermined coupling magnitude threshold(s) as a function of VCM current output frequency. The predetermined coupling magnitude threshold(s) (and associated filter(s)) applied to the second VCM current output may be the same or different from the predetermined coupling magnitude threshold(s) (and associated filter(s)) applied to the first VCM current output. If the second VCM current output remains below the predetermined coupling magnitude threshold(s), the second monitoring operation 776 and the second comparing operation 778 repeat iteratively while the HDD remains in operation.

If the predetermined coupling magnitude threshold is reached, a second disabling operation 780 disables write operations using the first independently operated actuator arm within the HDD. The disabling operation 780 prevents erroneous writes using the first actuator arm due to an unacceptable coupling effect caused by the second actuator arm. The disabling operation 780 lasts at least as long as the predetermined coupling magnitude threshold is met or exceeded (referred to herein as a coupling event). Once the coupling event ends, the monitoring operation 776 is repeated. Operations 776, 778, 780 repeat iteratively and substantially simultaneously with operations 770, 772, 774 as described above while the HDD remains in operation.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above operations may be implemented in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system implemented process.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A hard disc drive comprising:
   a spindle having a spindle motor to rotate at least one data storage platter, each data storage platter having at least one data storage surface;
   a first actuator arm including a first servo motor and a first write head, the first write head to selectively write data to one of the data storage surfaces;
   a second actuator arm including a second servo motor and a second write head, the second write head to selectively write data to one of the data storage surfaces, the first actuator arm moving independently from the second actuator arm; and
   a coupling observer to monitor output to the first servo motor and disable the second write head when the output to the first servo motor satisfies a predetermined coupling magnitude threshold between the first actuator arm and the second actuator arm.

2. The hard disc drive of claim 1, wherein the coupling observer includes a simple filter with a predetermined frequency range that disables the second write head.

3. The hard disc drive of claim 1, wherein the coupling observer includes a complex filter with a response that matches a previously mapped coupling magnitude response curve.

4. The hard disc drive of claim 1, further comprising:
   a write error monitor, wherein the coupling observer includes an adaptive filter that modifies filter response over time in response to an output of the write error monitor.

5. The hard disc drive of claim 1, wherein an output from the coupling observer precedes a corresponding coupling event.

6. The hard disc drive of claim 1, wherein the first write head selectively writes data to the same data storage surface as the second write head.

7. The hard disc drive of claim 1, wherein the first write head selectively writes data to a data storage surface on one side of a data storage platter and the second write head selectively writes data to a data storage surface on an opposite side of the same data storage platter.

8. The hard disc drive of claim 1, wherein the first write head selectively writes data to a data storage surface on one side of a data storage platter and the second write head selectively writes data to a data storage surface on the same side of another data storage platter.

9. The hard disc drive of claim 1, wherein the first actuator arm and the second actuator arm share a common spindle axis.

10. The hard disc drive of claim 1, wherein the first actuator arm and the second actuator arm have different spindle axes.

11. The hard disc drive of claim 1, further comprising:
    another coupling observer to monitor output to the second servo motor and disable the first write head when the output to the second servo motor satisfies a predetermined coupling threshold between the first actuator arm and the second actuator arm.

12. The hard disc drive of claim 11, wherein the coupling observer is connected to a voice coil motor current for the first actuator arm and the another coupling observer is connected to a voice coil motor current for the second actuator arm across a low latency port.

13. The hard disc drive of claim 1, wherein the coupling observer includes a counter that logs instances where the second write head is disabled.

14. The hard disc drive of claim 1, wherein the coupling observer includes a time-out feature that overrides an instance where the second write head is disabled should it exceed a predetermined time limit.

15. The hard disc drive of claim 1, wherein the coupling observer includes a settle feature that extends an instance where the second write head is disabled for a period beyond a point at which the first servo motor drops below the predetermined coupling magnitude threshold.

16. A method of selectively disabling write functionally within a hard disc drive comprising:
    monitoring output to a first servo motor of a first actuator arm, the first actuator arm including a first write head to selectively write data to a data storage surface;
    comparing the monitored output to the first servo motor to a first predetermined coupling magnitude threshold; and
    disabling write operations using a second actuator arm including a second write head, the second write head to selectively write data to a data storage surface, should the monitored output to the first servo motor exceed the first predetermined coupling magnitude threshold.

17. The method of claim 16, further comprising:
    monitoring output to a second servo motor of the second actuator arm;

comparing the monitored output to the second servo motor to a second predetermined coupling magnitude threshold; and disabling write operations using a first write head of the first actuator arm should the monitored output to the second servo motor exceed the second predetermined coupling magnitude threshold.

18. The method of claim 16, wherein the comparing operation utilizes a simple filter with a predetermined frequency range for triggering the disable write operations.

19. One or more computer-readable storage media encoding computer-executable instructions for executing on a computer system a computer process that selectively disables write functionally within a hard disc drive, the computer process comprising:

monitoring output to a first servo motor of a first actuator arm, the first actuator arm including a first write head to selectively write data a data storage surface;

comparing the monitored output to the first servo motor to a first predetermined coupling magnitude threshold; and disabling write operations using a second actuator arm including a second write head, the second write head to selectively write data to a data storage surface, should the monitored output to the first servo motor exceed the first predetermined coupling magnitude threshold.

20. The computer-readable storage media of claim 19, the computer process further comprising:

monitoring output to a second servo motor of the second actuator arm;

comparing the monitored output to the second servo motor to a second predetermined coupling magnitude threshold; and disabling write operations using a first write head of the first actuator arm should the monitored output to the second servo motor exceed the second predetermined coupling magnitude threshold.

* * * * *